(12) United States Patent
Oyaizu et al.

(10) Patent No.: US 11,772,644 B2
(45) Date of Patent: *Oct. 3, 2023

(54) DAMAGE REDUCTION DEVICE, DAMAGE REDUCTION METHOD, AND PROGRAM

(71) Applicant: Sony Group Corporation, Tokyo (JP)

(72) Inventors: Hideki Oyaizu, Tokyo (JP); Yuhi Kondo, Tokyo (JP); Yasutaka Hirasawa, Tokyo (JP); Suguru Aoki, Tokyo (JP); Taketo Akama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,319

(22) Filed: Jan. 6, 2022

(65) Prior Publication Data

US 2022/0126821 A1    Apr. 28, 2022

Related U.S. Application Data

(63) Continuation of application No. 16/599,740, filed on Oct. 11, 2019, now Pat. No. 11,254,307, which is a
(Continued)

(30) Foreign Application Priority Data

Sep. 29, 2015   (JP) ................................ 2015-190780

(51) Int. Cl.
  *B60W 30/095*     (2012.01)
  *B60R 21/0134*    (2006.01)
  (Continued)

(52) U.S. Cl.
  CPC ......... *B60W 30/0956* (2013.01); *B60R 21/00* (2013.01); *B60R 21/0134* (2013.01);
  (Continued)

(58) Field of Classification Search
  CPC .. B60W 30/0956; B60W 30/08; B60W 30/09; B60W 30/095; B60W 2554/00;
  (Continued)

(56) References Cited

U.S. PATENT DOCUMENTS 6,085,151 A    7/2000  Farmer et al.
6,168,198 B1   1/2001  Breed et al.
(Continued)

FOREIGN PATENT DOCUMENTS

CN       1836939 A    9/2006
CN     104842995 A    8/2015
(Continued)

OTHER PUBLICATIONS

Extended European Search Report dated May 16, 2019 in connection with European Application No. 16850557.6.
(Continued)

*Primary Examiner* — Richard M Camby
(74) *Attorney, Agent, or Firm* — Wolf, Greenfield & Sacks, P.C.

(57) ABSTRACT

A damage reduction device according to an embodiment of the present technology includes an input unit, a prediction unit, a recognition unit, and a determination unit. The input unit inputs status data regarding a status in a moving direction of a moving body apparatus. The prediction unit predicts a collision with an object in the moving direction on the basis of the status data. The recognition unit recognizes whether the object includes a person. The determination unit determines, when the collision with the object is predicted and it is recognized that the object includes a person, a steering direction of the moving body apparatus in which a collision with the person is avoidable, on the basis of the status data.

26 Claims, 9 Drawing Sheets

Related U.S. Application Data continuation of application No. 15/761,844, filed as application No. PCT/JP2016/003769 on Aug. 18, 2016, now Pat. No. 10,464,559.

(51) Int. Cl.

| | |
|---|---|
| *B60R 21/00* | (2006.01) |
| *B62D 6/00* | (2006.01) |
| *G08G 1/16* | (2006.01) |
| *B60W 30/08* | (2012.01) |
| *G06V 20/58* | (2022.01) |
| *B60W 30/09* | (2012.01) |
| *B62D 15/02* | (2006.01) |
| *H04N 23/50* | (2023.01) |
| *B60R 21/01* | (2006.01) |

(52) U.S. Cl.
CPC ............ *B60W 30/08* (2013.01); *B60W 30/09* (2013.01); *B60W 30/095* (2013.01); *B62D 6/00* (2013.01); *B62D 15/0265* (2013.01); *G06V 20/58* (2022.01); *G06V 20/584* (2022.01); *G08G 1/16* (2013.01); *G08G 1/166* (2013.01); *B60R 2021/01252* (2013.01); *B60W 2554/00* (2020.02); *B60W 2710/207* (2013.01); *H04N 23/50* (2023.01)

(58) Field of Classification Search
CPC .............. B60W 2710/207; B60R 21/00; B60R 21/0134; B60R 2021/01252; B62D 6/00; B62D 15/0265; G06V 20/58; G06V 20/584; G08G 1/16; G08G 1/166; H04N 23/50
See application file for complete search history.

(56) References Cited

U.S. PATENT DOCUMENTS

| | | | |
|---|---|---|---|
| 6,285,778 B1 | 9/2001 | Nakajima et al. | |
| 7,954,587 B2 | 6/2011 | Kisanuki et al. | |
| 9,315,192 B1 | 4/2016 | Zhu et al. | |
| 9,440,649 B2 | 9/2016 | Ciotlos et al. | |
| 9,481,366 B1 | 11/2016 | Gordon et al. | |
| 9,487,195 B2 * | 11/2016 | Fujishiro | B60W 30/09 |
| 9,701,306 B2 * | 7/2017 | Prokhorov | B60W 30/09 |
| 10,464,559 B2 * | 11/2019 | Oyaizu | B62D 15/0265 |
| 11,254,307 B2 * | 2/2022 | Oyaizu | B62D 6/00 |
| 2008/0097699 A1 | 4/2008 | Ono | |
| 2018/0281786 A1 | 10/2018 | Oyaizu et al. | |
| 2020/0039509 A1 | 2/2020 | Oyaizu et al. | |

FOREIGN PATENT DOCUMENTS

| | | |
|---|---|---|
| DE | 103 28 062 A1 | 1/2005 |
| DE | 102005003274 A1 | 7/2006 |
| DE | 10 2008 005 310 A1 | 7/2009 |
| DE | 10 2011 115 875 A1 | 4/2013 |
| DE | 10 2012 021004 A1 | 4/2014 |
| JP | 2000-095130 A | 4/2000 |
| JP | 2005-254923 A | 9/2005 |
| JP | 2007-125997 A | 5/2007 |
| JP | 2008-037313 A | 2/2008 |
| JP | 2009-012538 A | 1/2009 |
| JP | 2015-041222 A | 3/2015 |
| WO | WO 2006/070865 A1 | 7/2006 |
| WO | WO 2014/164327 A1 | 10/2014 |

OTHER PUBLICATIONS

Communication pursuant to Article 94(3) EPC dated Oct. 5, 2022 in connection with European Application No. 16850557.6.
International Search Report and English translation thereof dated Oct. 25, 2016 in connection with International Application No. PCT/JP2016/003769.
Written Opinion and English translation thereof dated Oct. 25, 2016 in connection with International Application No. PCT/JP2016/003769.
International Preliminary Report on Patentability and English translation thereof dated Apr. 12, 2018 in connection with International Application No. PCT/JP2016/003769.
Chinese Office Action dated Apr. 28, 2020 in connection with Chinese Application No. 201680055024.4, and English translation thereof.
Chinese Office Action dated Dec. 22, 2020 in connection with Chinese Application No. 201680055024.4, and English translation thereof.
Japanese Office Action dated Apr. 27, 2020 in connection with Japanese Application No. 2017-542689, and English translation thereof.

* cited by examiner

DAMAGE REDUCTION DEVICE, DAMAGE REDUCTION METHOD, AND PROGRAM

CROSS REFERENCE TO RELATED APPLICATIONS

The present application claims the benefit under 35 U.S.C. § 120 as a continuation application of U.S. application Ser. No. 16/599,740, filed on Oct. 11, 2019, now U.S. Pat. No. 11,254,307, which claims the benefit under 35 U.S.C. § 120 as a continuation application of U.S. application Ser. No. 15/761,844, filed on Mar. 21, 2018, now U.S. Pat. No. 10,464,559, which claims the benefit under 35 U.S.C. § 371 as a U.S. National Stage Entry of International Application No. PCT/JP2016/003769, filed in the Japanese Patent Office as a Receiving Office on Aug. 18, 2016, which claims priority to Japanese Patent Application Number JP 2015-190780, filed in the Japanese Patent Office on Sep. 29, 2015, each of which is hereby incorporated by reference in its entirety.

TECHNICAL FIELD

The present technology relates to an apparatus, method, and program for reducing damage of a collision accident that occurs in driving of an automobile, for example. The present technology is applicable not only to automobiles but also to various moving body apparatuses such as ships and autonomous traveling robots and is also applicable to various technical fields including simulation apparatuses and games of those above.

BACKGROUND ART

An automatic emergency brake that automatically brakes and an automatic avoidance technology of automatically avoiding collisions have been recently developed. Further, there has also been known a technology of minimizing, in a case where a collision of an object cannot be avoided by the automatic emergency brake, damage to a subject vehicle, a pedestrian, or a surrounding environment by use of a collision damage reduction brake, a collision avoidance system, and the like.

For example, Patent Literature 1 discloses a technology of controlling, when a collision is unavoidable and when another vehicle is about to collide with a subject vehicle, the subject vehicle to collide at an area of the subject vehicle where there is no passenger or where the strength of components is high. Further, Patent Literature 2 discloses a technology of causing a collision at an area of the subject vehicle where a collision object receives less shock. Furthermore, Patent Literature 3 discloses a technology of controlling, when a collision is unavoidable, travel of the subject vehicle such that another vehicle that receives a collision collides at a collision site excluding a cabin thereof.

CITATION LIST

Patent Literature

Patent Literature 1: Japanese Patent Application Laid-open No. 2015-041222
Patent Literature 2: Japanese Patent Application Laid-open No. 2005-254923
Patent Literature 3: Japanese Patent Application Laid-open No. 2008-037313

DISCLOSURE OF INVENTION

Technical Problem

However, the technologies disclosed in Patent Literatures 1 and 2 are for minimizing damage to the subject vehicle and do not disclose a technology for minimizing damage to another vehicle on the other party as well. Meanwhile, the technology disclosed in Patent Literature 3 is for simply avoiding a collision with a cabin portion of the other vehicle on the other party, and does not determine whether there is a passenger therein actually. Furthermore, Patent Literatures 1 to 3 disclose nothing about a technology of performing, in a case where there are multiple collision objects other than the vehicle, different control depending on the objects.

In view of the circumstances as described above, it is an object of the present technology to provide a damage reduction device, a damage reduction method, and a program that are capable of achieving reduction in human damage.

Solution to Problem

A damage reduction device according to an embodiment of the present technology includes an input unit, a prediction unit, a recognition unit, and a determination unit.

The input unit inputs status data regarding a status in a moving direction of a moving body apparatus.

The prediction unit predicts a collision with an object in the moving direction on the basis of the status data.

The recognition unit recognizes whether the object includes a person.

The determination unit determines, when the collision with the object is predicted and it is recognized that the object includes a person, a steering direction of the moving body apparatus in which a collision with the person is avoidable, on the basis of the status data.

Under a situation where a collision with an object is predicted, when it is recognized that the object includes a person, the damage reduction device determines a steering direction of the moving body apparatus in which a collision with the person is avoidable, on the basis of the status data. This enables movement control of the moving body apparatus in which priority is given to avoidance of the collision with the person.

The determination unit may be configured to determine, when it is predicted that a collision with the object other than the person is unavoidable, a collision mode of the moving body apparatus to the object on the basis of a type of the object.

This can suitably achieve reduction in human damage depending on the type of a collision object.

The determination unit may be configured to determine, when the object is recognized as a manned moving body, a target collision site of the object, with which the moving body apparatus is to collide, and determine, when the object is recognized as an unmanned structure, a target collision site of the moving body apparatus that collides with the object.

This can achieve reduction in damage to a passenger of the manned moving body when the object is a manned moving body, and achieve reduction in damage to a passenger of the moving body apparatus when the object is recognized as an unmanned structure.

The status data may include object passenger data regarding a sitting position of a passenger in the manned moving body. In this case, the determination unit determines, when the object is recognized as the manned moving body, a target collision site of the manned moving body on the basis of the object passenger data.

This can achieve reduction in damage to the passenger of the manned moving body.

The damage reduction device may further include an object passenger estimation unit that estimates the sitting position of the passenger of the manned moving body on the basis of the object passenger data. In this case, the determination unit determines a non-sitting position of the passenger of the manned moving body or a vicinity thereof as a target collision site of the manned moving body.

This can suppress human damage on the other party due to a collision to be suppressed at a minimum.

The input unit may be configured to further input moving-body passenger data regarding a sitting position of a passenger of the moving body apparatus. In this case, the damage reduction device further includes a passenger grasping unit that grasps the sitting position of the passenger of the moving body apparatus on the basis of the moving-body passenger data, and the determination unit further determines a target collision site of the moving body apparatus that collides with the object, on the basis of the status data and the moving-body passenger data.

This can reduce damage to the passenger of the moving body apparatus.

In this case, the determination unit may determine a non-sitting position of the passenger of the moving body apparatus or a vicinity thereof as a target collision site of the moving body apparatus.

This can suppress damage to a passenger due to a collision to be suppressed at a minimum.

The damage reduction device may further include an output unit that outputs control data for moving the moving body apparatus in the steering direction determined by the determination unit, to a control unit that controls a moving operation of the moving body apparatus.

The damage reduction device may be mounted to the moving body apparatus that is equipped with at least a distance sensor for the moving direction and a front camera. In this case, the input unit inputs data from the distance sensor and the front camera as the status data.

A damage reduction method according to an embodiment of the present technology includes inputting status data regarding a status in a moving direction of a moving body apparatus.

A collision with an object in the moving direction is predicted on the basis of the status data.

Whether the object includes a person is recognized.

When the collision with the object is predicted and it is recognized that the object includes a person, a steering direction of the moving body apparatus in which a collision with the person is avoidable is determined on the basis of the status data.

A program according to an embodiment of the present technology causes a computer to execute the steps of: inputting status data regarding a status in a moving direction of a moving body apparatus; predicting a collision with an object in the moving direction on the basis of the status data; recognizing whether the object includes a person; and determining, when the collision with the object is predicted and it is recognized that the object includes a person, a steering direction of the moving body apparatus in which a collision with the person is avoidable, on the basis of the status data.

Advantageous Effects of Invention

As described above, according to the present technology, it is possible to achieve reduction in human damage.

It should be noted that the effects described herein are not necessarily limited and any one of the effects described in the present disclosure may be produced.

MODE(S) FOR CARRYING OUT THE INVENTION

General Outline

A technology disclosed in this specification aims at suppressing damage caused by a collision, particularly, human damage at a minimum in a situation where a moving body apparatus cannot avoid a collision with an object such as a different manned moving body, a person, or a structure that is present in a moving direction of the moving body apparatus when the moving body apparatus is traveling.

Here, the moving body apparatus described above is, typically, a vehicle (subject vehicle) such as an automobile. In this case, the different manned moving body described above is also a vehicle on the other party (different vehicle) that receives a collision of the subject vehicle.

Meanwhile, the person described above typically corresponds to a passer-by such as a pedestrian and includes, in addition thereto, a passenger of the subject vehicle or the different vehicle.

Furthermore, the structure described above typically corresponds to a road installation object such as a utility pole, a signal, a street tree, a wall, or a guardrail that is installed on a road or the like and includes, in addition thereto, an unmanned and parked vehicle, for example.

In the following embodiments, a collision object (object) will be exemplified mainly as a vehicle, a structure, or a person, but it is needless to say that the present technology is not limited to those embodiments.

Hereinafter, embodiments according to the present technology will be described with reference to the drawings.

First Embodiment

[Configuration of Automobile]

Figure 1:
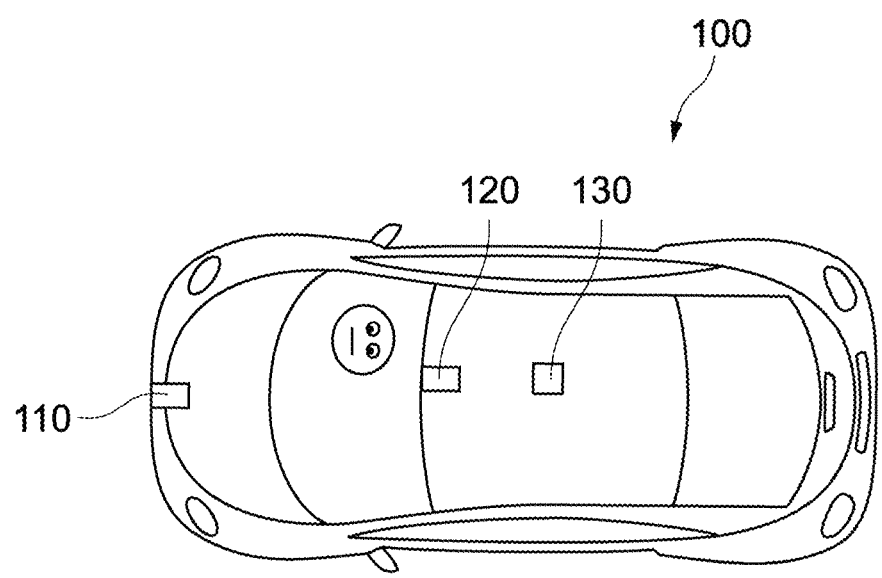
FIG. 1 is an outer appearance view of a configuration of an automobile as an example of a moving body apparatus equipped with a damage reduction device according to an embodiment of the present technology.
Figure 2:
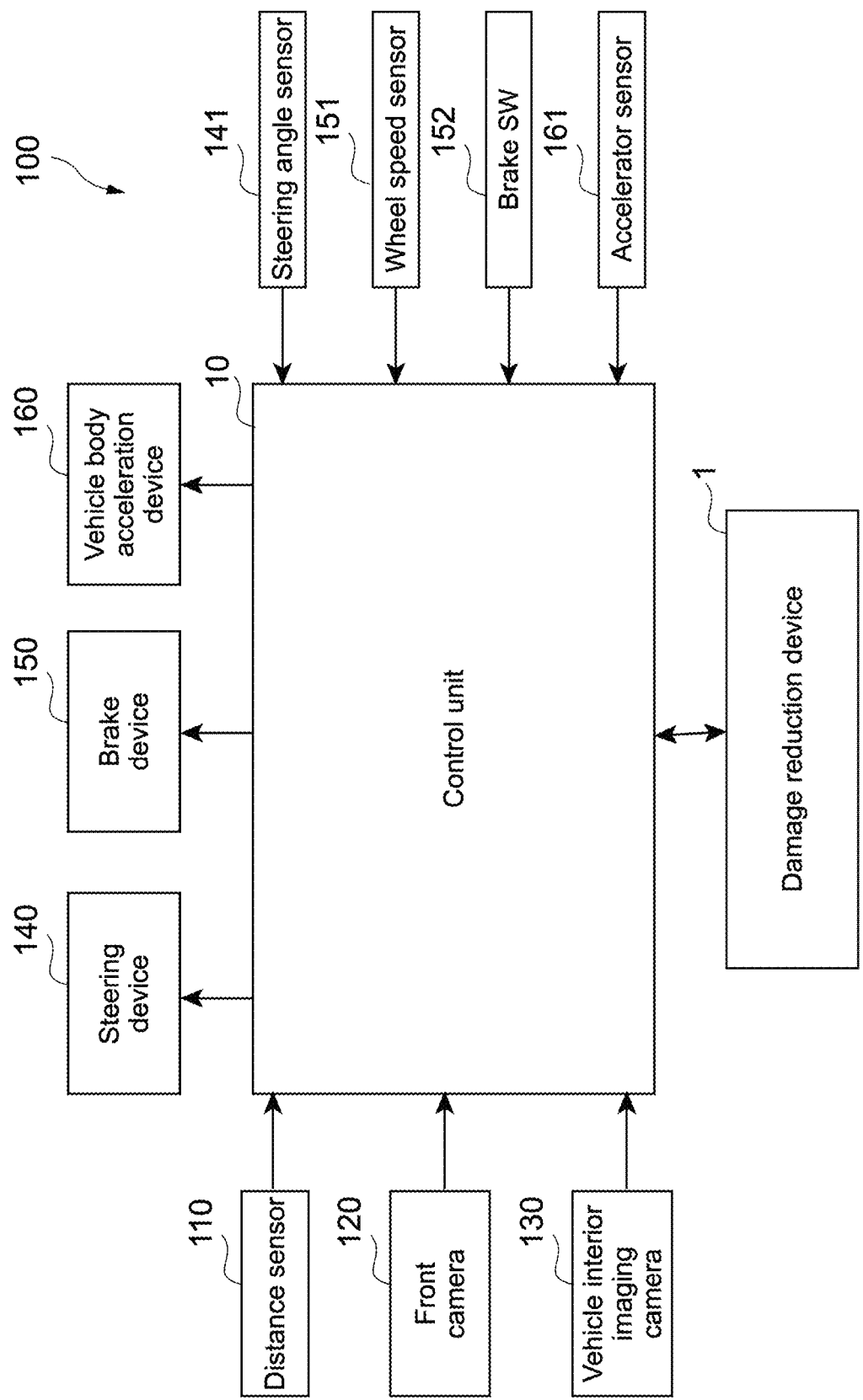
FIG. 2 is a block diagram showing a configuration of the automobile.

FIG. 1 is an outer appearance view of a configuration of an automobile as an example of a moving body apparatus equipped with a damage reduction device according to an embodiment of the present technology. FIG. 2 is a block diagram thereof.

(Basic Configuration)

As shown in FIG. 1, an automobile 100 (hereinafter, also referred to as subject vehicle) includes a distance sensor 110 for a moving direction, a front camera 120, and a vehicle interior imaging camera 130 that images a passenger status within the vehicle.

Further, as shown in FIG. 2, the automobile 100 includes a steering device 140, a brake device 150, a vehicle body acceleration device 160, a steering angle sensor 141, a wheel speed sensor 151, a brake switch 152, an accelerator sensor 161, a control unit 10, and a damage reduction device 1.

The distance sensor 110 is installed, for example, substantially at the center of the front part of the automobile 100 and outputs, to the control unit 10, data regarding a distance between the automobile 100 and a physical object present in a moving direction thereof. The output of the distance sensor 110 is referred to, for example, for calculation of a relative distance, a relative speed, or a relative acceleration with respect to a physical object (vehicle, pedestrian, structure, or the like) present in front of the subject vehicle, as will be described later. The distance sensor 110 includes, for example, various sensors using a millimeter-wave radar, an infrared laser, and the like.

The front camera 120 is installed in, for example, a cabin or roof part of the automobile 100 and images the forward field of view of the automobile 100 at a predetermined frame rate. The image data captured by the front camera 120 is output to the control unit 10 and is, as will be described later, referred to for determination of the type of the physical object (vehicle, pedestrian, structure, or the like) present in front of the subject vehicle, for calculation of a riding position of a passenger within the vehicle, and relative positions of the physical object described above and the subject vehicle, and the like. The front camera 120 includes, for example, an image sensor such as a CMOS or a CCD.

The vehicle interior imaging camera 130 is installed in the cabin of the automobile 100 and images the interior status of the cabin at a predetermined frame rate. The image data captured by the vehicle interior imaging camera 130 is output to the control unit 10 and is, as will be described later, referred to for determination of the presence or absence of a passenger of the subject vehicle and the riding position thereof. The front camera 120 includes, for example, an image sensor such as a CMOS or a CCD.

It should be noted that the distance sensor 110, the front camera 120, and the vehicle interior imaging camera 130 may be configured such that the outputs therefrom are supplied to the damage reduction device 1, instead of the configuration in which the outputs therefrom are supplied to the control unit 10 as shown in FIG. 2.

The steering device 140 typically includes a power steering device and transmits a driver's steering wheel operation to a steering wheel. The brake device 150 includes brake actuators attached to respective wheels and a hydraulic circuit that actuates those brake actuators, and transmits an operational force by depressing a brake pedal to the brake actuators via the hydraulic circuit. The brake device 150 typically has an ABS control function for preventing lock (slip) of the wheels or a traction control function for preventing driving slip of drive wheels. The vehicle body acceleration device 160 includes a throttle valve, a fuel injector, and the like and controls a rotational acceleration of the drive wheels.

The control unit 10 controls the steering device 140, the brake device 150, and the vehicle body acceleration device 160. In other words, the control unit 10 detects a steering amount and a steering direction and controls the steering device 140, on the basis of the output of the steering angle sensor 141 that detects the driver's steering wheel operation. Further, the control unit 10 calculates a vehicle body speed of the vehicle and also controls the brake device 150 so as to prevent the lock (slip) of the wheels, on the basis of the outputs of the wheel speed sensors 151 installed on all of the wheels or some of the wheels. The brake switch 152 is for detecting a brake operation (depression of the brake pedal) by the driver, and is referred to in the ABS control and the like. Furthermore, the control unit 10 controls the vehicle body acceleration device 160 on the basis of the output of the accelerator sensor 161 that detects an operation amount of an accelerator pedal of the driver.

The control unit 10 may control some of the steering device 140, the brake device 150, and the vehicle body acceleration device 160 in cooperation with one another as well as when the control unit 10 controls them individually. This enables the automobile 100 to be controlled to have a desired posture in turning, braking, acceleration, and the like.

Further, the control unit 10 is configured to be capable of controlling the steering device 140, the brake device 150, and the vehicle body acceleration device 160 irrespective of the above-mentioned various operations of the driver. For example, the automobile 100 may have an automated driving function. In this case, the control unit 10 takes the initiative in controlling the devices described above on the basis of the outputs of the sensors and cameras described above. In particular, in this embodiment, the control unit 10 is configured to be capable of controlling at least one of the devices described above on the basis of the output of the damage reduction device 1 that will be described later.

It should be noted that the control unit 10 may be an aggregate of ECUs that individually control the steering device 140, the brake device 150, and the vehicle body acceleration device 160 or may be a single controller that collectively controls those devices. Further, the steering device 140, the brake device 150, and the vehicle body acceleration device 160 may individually include the ECUs described above. In this case, the control unit 10 is configured to individually output a control signal to the ECUs of the respective devices.

(Damage Reduction Device)

The damage reduction device 1 executes damage reduction behavior, which will be described later, in an emergency where there is a high possibility of a collision, to thus reduce damage to a passenger of a vehicle on the other party, a passenger of a subject vehicle (automobile 100), and the like. Examples of a collision object include a vehicle, a person, and a road installation object. In this embodiment, a vehicle, typically, an oncoming vehicle or preceding vehicle that is traveling in front of the automobile 100, a vehicle parked in front of the automobile 100, and the like (hereinafter, collectively referred to as object vehicle) will be described as examples of the collision object.

Figure 3:
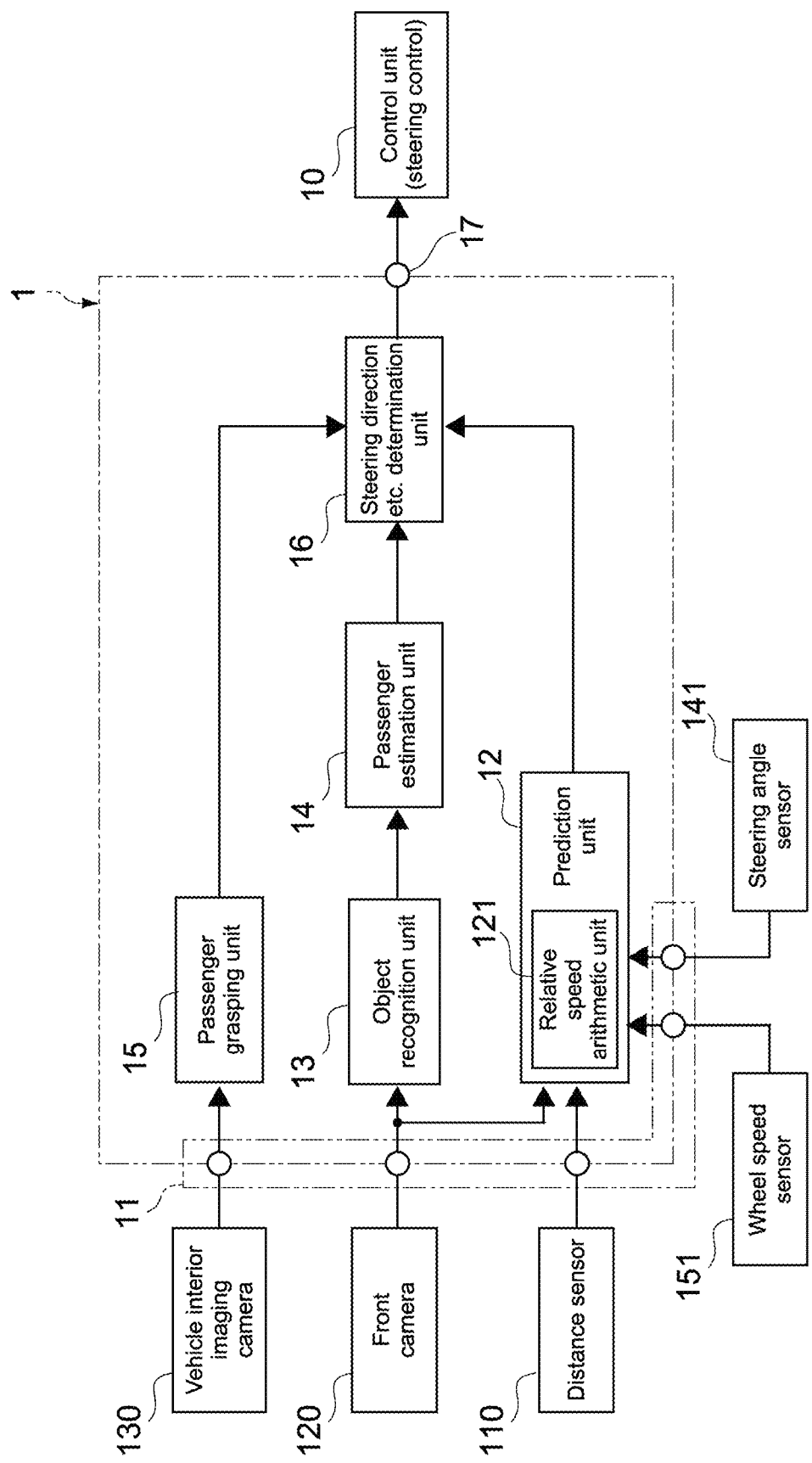
FIG. 3 is a block diagram showing a configuration of the damage reduction device.

FIG. 3 is a block diagram showing a configuration of the damage reduction device 1.

As shown in FIG. 3, the damage reduction device 1 includes an input unit 11, a prediction unit 12, an object recognition unit 13, a passenger estimation unit 14, a passenger grasping unit 15, a determination unit 16, and an output unit 17.

The input unit 11 inputs status data regarding a status in the moving direction (traveling direction) of the automobile 100. The status data is, for example, data regarding an object (a vehicle, a person, or a structure such as a road installation object) located in front of the automobile 100.

The status data includes traveling data regarding a traveling state of the object vehicle approaching the automobile 100 (object vehicle traveling data), passenger data regarding a riding position of a passenger of the object vehicle (object vehicle passenger data), and the like. The traveling data and the passenger data of the object vehicle correspond to output data of the distance sensor 110 and imaging data of the front camera 120 that are input via the control unit 10.

The input unit 11 further inputs passenger data regarding a sitting position of a passenger of the automobile 100 (subject vehicle passenger data). The subject vehicle passenger data corresponds to imaging data of the vehicle interior imaging camera 130 that is input via the control unit 10.

It should be noted that the input unit 11 is configured to be capable of inputting various types of data associated with the traveling state of the automobile 100, e.g., outputs of various sensors such as the steering angle sensor 141 and the wheel speed sensor 151, control information for the brake device or the like in the control unit 10, and the like.

The prediction unit 12 is configured to be capable of predicting a collision between the automobile 100 and the object vehicle and a collision site on the basis of the object vehicle traveling data.

As shown in FIG. 3, the prediction unit 12 includes a relative speed arithmetic unit 121 that calculates a relative distance, a relative speed, and the like between the automobile 100 and the object vehicle from the output data of the distance sensor 110. The prediction unit 12 determines whether the automobile 100 and the object vehicle are likely to collide with each other from the traveling states of the automobile 100 and the object vehicle at the present moment.

Typically, the prediction unit 12 compares, on the basis of the object vehicle traveling data, the traveling state of the subject vehicle (automobile 100) and the traveling state of the object vehicle, and estimates a possibility of a collision, a position of a collision, and further collision sites of the subject vehicle and the vehicle on the other party, from an intersection point of traveling tracks of both of the vehicles. For the traveling track of the subject vehicle, a vehicle body speed and a steering angle that are calculated on the basis of the outputs of the wheel speed sensor 151 and the steering angle sensor 141 are referred to. For the traveling track of the object vehicle, a relative position and a relative speed of the object vehicle with respect to the subject vehicle, which are calculated on the basis of the output of the distance sensor 110, are referred to.

The prediction unit 12 may be configured to refer to the image data of the front camera 120 as well, to predict a collision between the subject vehicle and the object vehicle. In this case, a captured image of the front camera 120 is analyzed, so that the course of the object vehicle or a collision site can be predicted with accuracy. Predicted data generated in the prediction unit 12 is output to the determination unit 16.

The object recognition unit 13 is configured to be capable of recognizing a type of the object with which the automobile 100 collides. In this embodiment, the object recognition unit 13 classifies the object into three types of a vehicle, a person, and a structure such as a road installation object, but the object is not limited thereto as a matter of course. For the recognition method, various person recognition technologies, vehicle recognition technologies, and the like can be used.

In particular, in this embodiment, the object recognition unit 13 recognizes whether the object includes a person. For example, in a case where the object is a vehicle, the object recognition unit 13 recognizes the presence or absence of a passenger in the vehicle. In this case, the object recognition unit 13 analyzes image data (object vehicle passenger data) output from the front camera 120 and detects the presence or absence of a passenger in the object vehicle. Recognized data generated in the object recognition unit 13 is output to the determination unit 16.

The passenger estimation unit 14 estimates a sitting position of a passenger of the object vehicle on the basis of the object vehicle passenger data. In this embodiment, the passenger estimation unit 14 estimates the sitting position of the passenger of the object vehicle on the basis of the output of the object recognition unit 13. The passenger estimation unit 14 estimates the presence or absence of a person in a driver's seat, a front passenger seat, or a rear seat of the object vehicle from a result of the analysis for the interior of the object vehicle, which is imaged by the front camera 120 and recognized as a person by the object recognition unit 13. Estimated data generated in the passenger estimation unit 14 is output to the determination unit 16.

Here, in a case where the object vehicle is traveling, the presence or absence of a passenger in a seat other than the driver's seat is estimated. When it is impossible to determine whether there is a passenger in the front passenger seat or the rear seat, it may be estimated that there is a passenger. Meanwhile, in a case where the object vehicle is parked, the presence or absence of a passenger in all the seats including the driver's seat is estimated. It should be noted that the determination on whether the object vehicle is traveling or parked is made on the basis of the output of the distance sensor 110 or the front camera 120.

The passenger grasping unit 15 grasps a sitting position of a passenger of the automobile 100 on the basis of the image data (subject vehicle passenger data) output from the vehicle interior imaging camera 130. The passenger grasping unit 15 grasps the presence or absence of a passenger other than the driver within the automobile 100, and in a case where there is a passenger, a riding position thereof. Grasped data generated in the passenger grasping unit 15 is output to the determination unit 16.

It should be noted that various methods can be employed for the passenger grasping technology. Typically, the person recognition technology is used. Other than that technology, a technology of executing matching with an image of the interior of an unmanned vehicle to estimate the presence or absence of a person may be employed.

The determination unit 16 determines, when it is predicted that a collision with the object vehicle is unavoidable on the basis of the outputs of the prediction unit 12, the passenger estimation unit 14, and the passenger grasping unit 15, a collision mode of the automobile 100 against the object vehicle (in this example, a target collision site of the object vehicle, at which the automobile 100 is to collide) according to the riding position of the passenger of the object vehicle. This is for the purpose of causing the automobile 100 to collide at the site capable of reducing human damage to the object vehicle on the other party and the automobile 100.

Specifically, the determination unit 16 is configured to determine a non-sitting position of a passenger of the object vehicle or its vicinity as a target collision site of the object vehicle. In other words, when it is recognized that the object vehicle includes a person, a target collision position is determined for a site other than the riding position of the passenger of the object vehicle. This enables human damage on the other party due to the collision to be suppressed at a minimum.

Further, in a case where the object vehicle is moving toward the automobile 100 and it is estimated that a sitting position of a passenger of the object vehicle is only the driver's seat, the determination unit 16 determines the front part on the seat (front passenger seat) side next to the driver's seat of the object vehicle as a target collision site of the object vehicle. This enables reduction in damage to the driver of the object vehicle.

Meanwhile, in a case where the object vehicle is moving toward the automobile 100 and it is estimated that a sitting position of a passenger of the object vehicle includes the driver's seat and the seat next thereto (front passenger seat), the determination unit 16 determines the center of the front part of the object vehicle as a target collision site of the object vehicle. This enables reduction in damage to each passenger on the other party due to the collision.

In such a manner, under the situation where a collision with the object vehicle is unavoidable, a target collision site of the object vehicle, at which the automobile 100 is to collide, is determined on the basis of the object vehicle passenger data. Thus, it is possible to cause the automobile 100 to collide at the site capable of reducing human damage to the object vehicle on the other party.

Furthermore, the determination unit 16 may be configured to refer to a sitting position of a passenger of the automobile 100 (output of the passenger grasping unit 15) as well as that of the object vehicle, to determine a target collision site of the automobile 100 that collides at the target collision site of the object vehicle. This enables reduction not only in damage to the passenger of the object vehicle that receives a collision, but also in damage to the passenger of the automobile 100 that collides.

Specifically, the determination unit 16 determines a non-sitting position of a passenger of the automobile 100 or its vicinity as a target collision site of the automobile 100. This enables not only damage to the other party but also damage to the passenger of the subject vehicle due to the collision to be suppressed at a minimum.

For example, in a case where a sitting position of a passenger of the automobile 100 is grasped as the driver's seat and the seat next thereto, the determination unit 16 determines the center of the front part of the automobile 100 as a target collision site of the automobile 100. This enables reduction in damage to the passengers of the subject vehicle.

The determination unit 16 generates, at the time when a collision with the object vehicle is predicted, control data by which an automatic brake function of actuating the brake device of the automobile 100 is executed. The determination unit 16 then generates, at the time when it is predicted that a collision with the object vehicle is unavoidable, control data by which a steering direction of the automobile 100 is determined such that a target collision site of the automobile 100 can be caused to collide toward a target collision site of the object vehicle.

The output unit 17 is configured to output the control data, which is for moving the automobile 100 toward the target collision site of the object vehicle, the target collision site being determined by the determination unit 16, to the control unit 10 that controls a moving operation of the automobile 100.

The damage reduction device 1 configured as described above includes hardware necessary for a computer, e.g., a CPU, a RAM, and a ROM. The CPU loads a program according to the present technology, which is recorded in the ROM in advance, to the RAM for execution, and thus a damage reduction method according to the present technology is executed.

A specific configuration of the damage reduction device 1 is not limited. For example, a PLD (Programmable Logic Device) such as an FPGA (Field Programmable Gate Array) or other devices such as an ASIC (Application Specific Integrated Circuit) may be used. Further, the damage reduction device 1 may be configured as a part of the control unit 10.

[Operation of Automobile]

Next, a damage reduction method according to this embodiment will be described together with a typical operation of the automobile 100 configured as described above.

Figure 4:
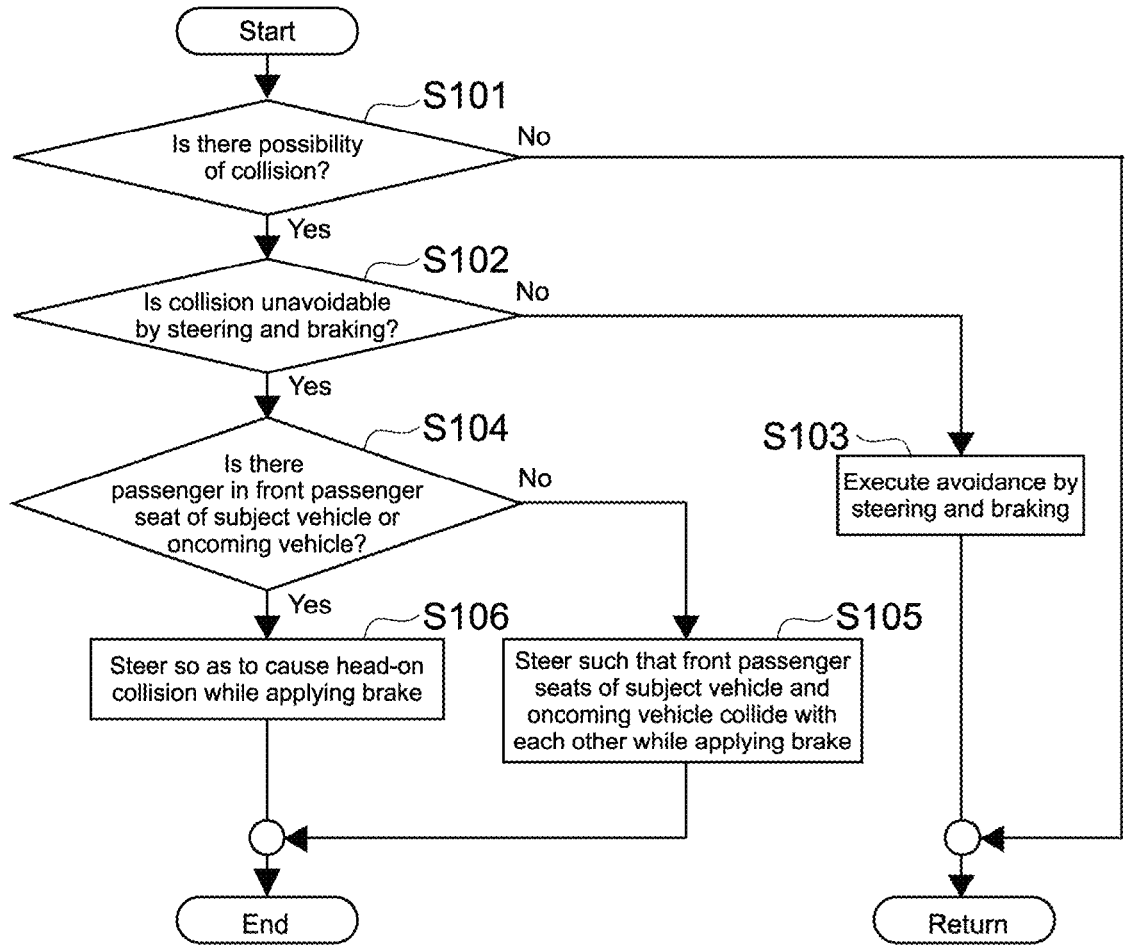
FIG. 4 is a flowchart for describing an action of the damage reduction device.
Figure 5:
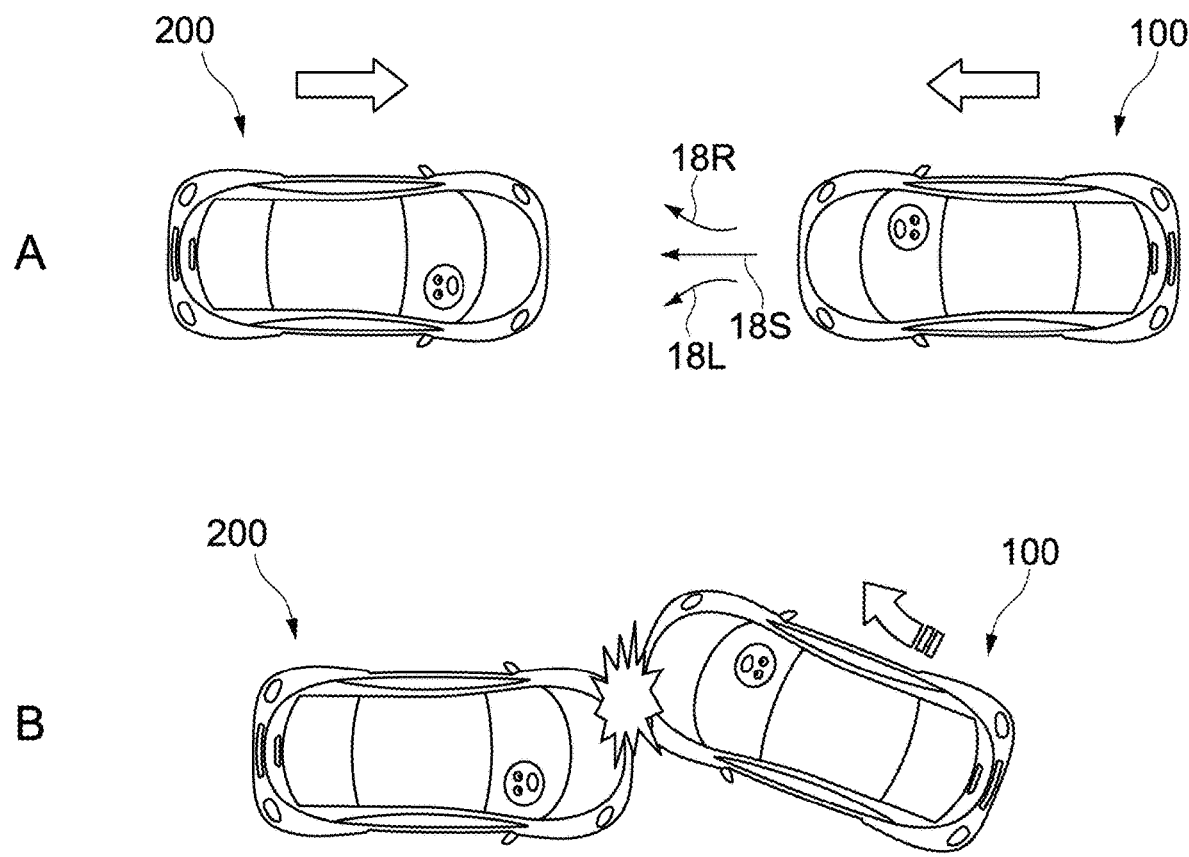
FIG. 5 is a schematic plan view for describing an operation example of the automobile.
Figure 6:
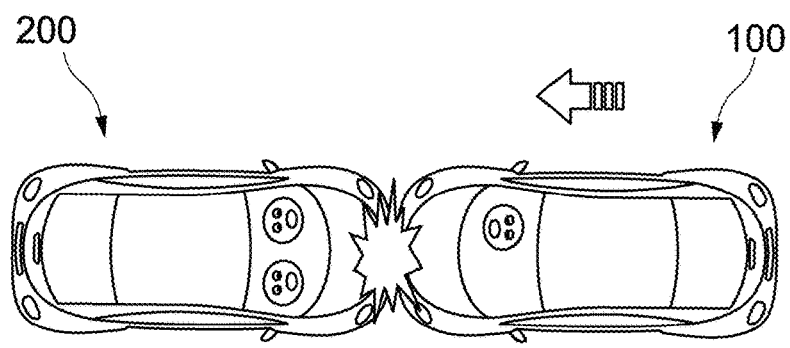
FIG. 6 is a schematic plan view for describing another operation example of the automobile.

FIG. 4 is a flowchart showing a control flow of the determination unit 16 in the damage reduction device 1. FIGS. 5 and 6 are diagrams for describing examples of the movement control of the automobile 100.

As shown in part A of FIG. 5, considered is a case where the automobile 100 that goes straight ahead or goes to the left in the figure and an oncoming vehicle 200 as an object vehicle that goes straight ahead or goes to the right in the figure approach each other.

The damage reduction device 1 first determines whether there is a possibility that the automobile 100 collides with the oncoming vehicle 200 (Step 101). This determination is executed on the basis of the output of the prediction unit 12. When there is a possibility of a collision, the damage reduction device 1 determines whether a collision is avoidable by steering and braking (Step 102).

When it is determined that a collision with the oncoming vehicle 200 is avoidable by sudden turning, sudden braking, and the like, an operation of avoiding that collision is executed (Step 103). This operation does not need an operation of the driver and causes the control unit 10 to directly output a control command to the steering device 140 and the brake device 150. In order to determine the steering direction (avoidance direction), for example, the image data from the front camera 120 is referred to.

Meanwhile, when it is determined that a collision with the oncoming vehicle 200 is unavoidable, the determination unit 16 determines to which direction among right turning, left turning, and straight (see reference symbols 18R, 18L, and 18S, respectively in part A of FIG. 5) the steering direction of the automobile 100 is controlled in order to reduce damage due to a collision. In this regard, the determination unit 16 determines whether there is a passenger in the front passenger seat of any of the automobile 100 (subject vehicle) and the oncoming vehicle 200 (Step 104). In this step, the outputs of the passenger estimation unit 14 and the passenger determination unit 15 are referred to.

As a result, when it is determined that there is no passenger in the front passenger seat of any of the subject vehicle and the oncoming vehicle 200, the determination unit 16 determines that the front part on the front passenger seat side of the subject vehicle and the front part on the front passenger seat side of the oncoming vehicle 200 are target collision positions. The determination unit 16 then outputs control data regarding steering and braking of the subject vehicle to the control unit 10, so as to turn the automobile 100 to the right while applying a brake and cause the front part on the front passenger seat side of the subject vehicle to collide at the front part on the front passenger seat side of the oncoming vehicle 200 in a collision mode shown in part B of FIG. 5 (Step 105). It should be noted that in a case where a driving operation by a driven vehicle of the subject vehicle is being performed during the steering control described above, priority is given to the steering control by the control unit 10.

In such a manner, when the front passenger seat side of the subject vehicle and the front passenger seat side of the oncoming vehicle 200 are caused to collide with each other, a shock at the collision is absorbed in spaces where there are no passengers in both of the vehicles. Therefore, compared with a collision at the front parts on the driver's seat sides or a head-on collision, damage to the drivers of the subject vehicle and the oncoming vehicle 200 can be suppressed at a minimum.

Meanwhile, when it is determined that there is a passenger in the front passenger seat of any of the subject vehicle and the oncoming vehicle 200, the determination unit 16 determines that the center of the front part of the subject vehicle and the center of the front part of the oncoming vehicle 200 are target collision sites. The determination unit 16 then outputs, to the control unit 10, control data regarding steering and braking of the subject vehicle to cause the automobile 100 to go straight while applying a brake and cause the oncoming vehicle 200 and the subject vehicle collide head-on with each other in a collision mode shown in FIG. 6 (Step 106). It should be noted that in a case where a driving operation by a driven vehicle of the subject vehicle is being performed during the steering control described above, priority is given to the steering control by the control unit 10.

In such a manner, when the subject vehicle and the oncoming vehicle 200 are caused to collide head-on with each other, each cabin is inhibited from being locally deformed as in the offset collision. Therefore, compared with a collision at the front parts on the driver's seat sides or the front passenger seat sides, damage to all the passengers of the subject vehicle and the oncoming vehicle 200 can be suppressed at a minimum.

As described above, in this embodiment, in a case where a collision between the automobile 100 and the oncoming vehicle 200 is unavoidable, positions of the passengers of the automobile 100 and the oncoming vehicle 200 are referred to, so that a collision site of each of the automobile 100 and the oncoming vehicle 200 is determined. This enables damage not only to the passengers of the subject vehicle but also to the passengers of the vehicle on the other party to be suppressed at a minimum.

It should be noted that a non-riding position of a passenger of the object vehicle is determined as a target collision site of the object vehicle in a similar manner to the case where the object vehicle is a preceding vehicle or a parked vehicle. This enables human damage on the other party to be suppressed at a minimum while protecting a passenger of the subject vehicle.

Second Embodiment

Subsequently, another embodiment of the present technology will be described.

Figure 7:
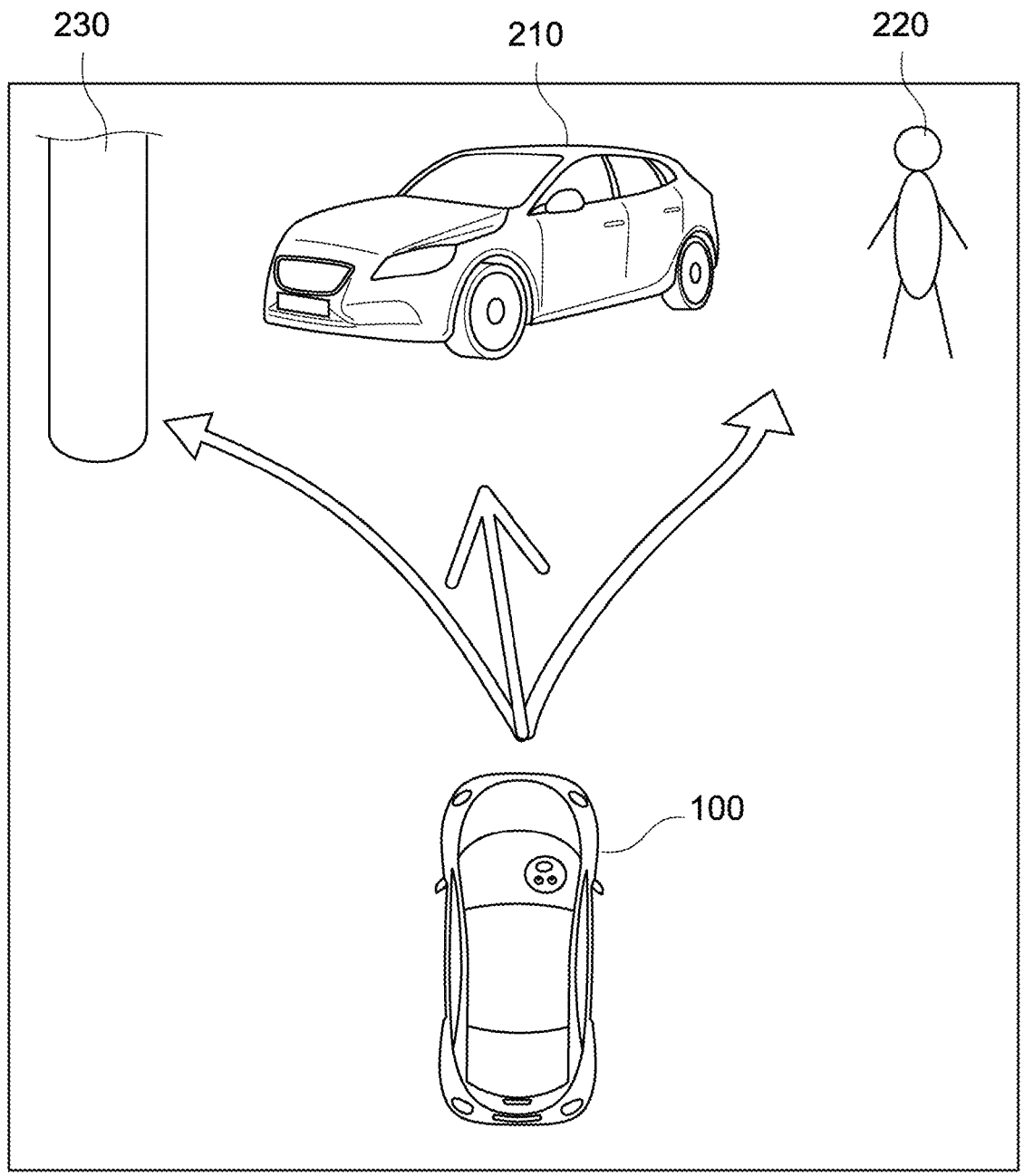
FIG. 7 is a diagram for describing another embodiment of the damage reduction device.

In this embodiment, as shown in FIG. 7, a case where an object having a possibility of a collision with an automobile 100 includes not only a vehicle 210 but also a pedestrian 220 and a road installation object such as a utility pole 230 will be described as an example.

A damage reduction device 1 according to this embodiment and an automobile 100 equipped with this damage reduction device 1 have configurations similar to those of the first embodiment. Hereinafter, a configuration different from that of the first embodiment will be mainly described, and a configuration similar to that of the first embodiment will be denoted by a similar reference symbol and description thereof will be omitted or simply described.

The damage reduction device 1 of this embodiment includes an input unit 11, a prediction unit 12, an object recognition unit 13, and a determination unit 16 (see FIG. 3).

The input unit 11 inputs status data regarding a status in a moving direction (traveling direction) of the automobile 100. The status data is, for example, data regarding an object (vehicle 210, pedestrian 220, or utility pole 230) located in front of the automobile 100.

The recognition object unit 13 is configured to be capable of recognizing a type of the object with which the automobile 100 collides on the basis of the status data, and classifies the object into three types of, e.g., a car (vehicle 210), a person (pedestrian 220), and an unmanned structure (road installation object such as utility pole 230).

The determination unit 16 determines, when a collision with the object described above is predicted and when it is recognized that the object described above includes a person, a steering direction of the automobile 100 in which a collision with the person is avoidable, on the basis of the status data described above. In other words, when the object includes the pedestrian 220, avoidance of a collision with the pedestrian 220 is set as a control target having the highest priority.

Further, the determination unit 16 is configured to determine, when it is predicted that a collision with the object is unavoidable, a collision mode of the automobile 100 against the object on the basis of the type of the object. In other words, the damage reduction device 1 of this embodiment is configured to perform different collision modes for the objects depending on whether the object is the vehicle 210, the pedestrian 220, or the road installation object such as the utility pole 230.

The determination unit 16 determines, when the object is recognized as the vehicle 210, a target collision site of the vehicle 210 (object vehicle) by a method similar to that of the first embodiment described above. At that time, the determination unit 16 refers to a riding position of a passenger of the subject vehicle as well, and determines a target collision site capable of reducing damage to the passengers of both of the vehicle on the other party and the subject vehicle.

Meanwhile, the determination unit 16 determines, when the object is recognized as an unmanned structure such as the utility pole 230, a site having relatively high rigidity in the automobile 100, e.g., a pillar site, as a target collision site of the automobile 100. This enables damage to the passenger of the subject vehicle to be suppressed. In this case as well, the riding position of the passenger of the subject vehicle can be referred to on the basis of the output of the passenger grasping unit 15 (see FIG. 3). For example, in a case where there is no passenger in the front passenger seat, the pillar on the front passenger seat side is determined as a target collision site, thus enabling damage to the driver to be suppressed at a minimum.

Alternatively, under a situation where there is no object other than a pedestrian and where a collision with the pedestrian is already unavoidable, in order to reduce damage to the pedestrian as much as possible, a site having high shock-absorbing property in the automobile 100 is determined as a target collision position. Examples of the site having high shock-absorbing property include a site having relatively low rigidity such as the hood or the front glass, and a site at which a shock-absorbing apparatus such as an air-bag for pedestrians is installed.

Figure 8:
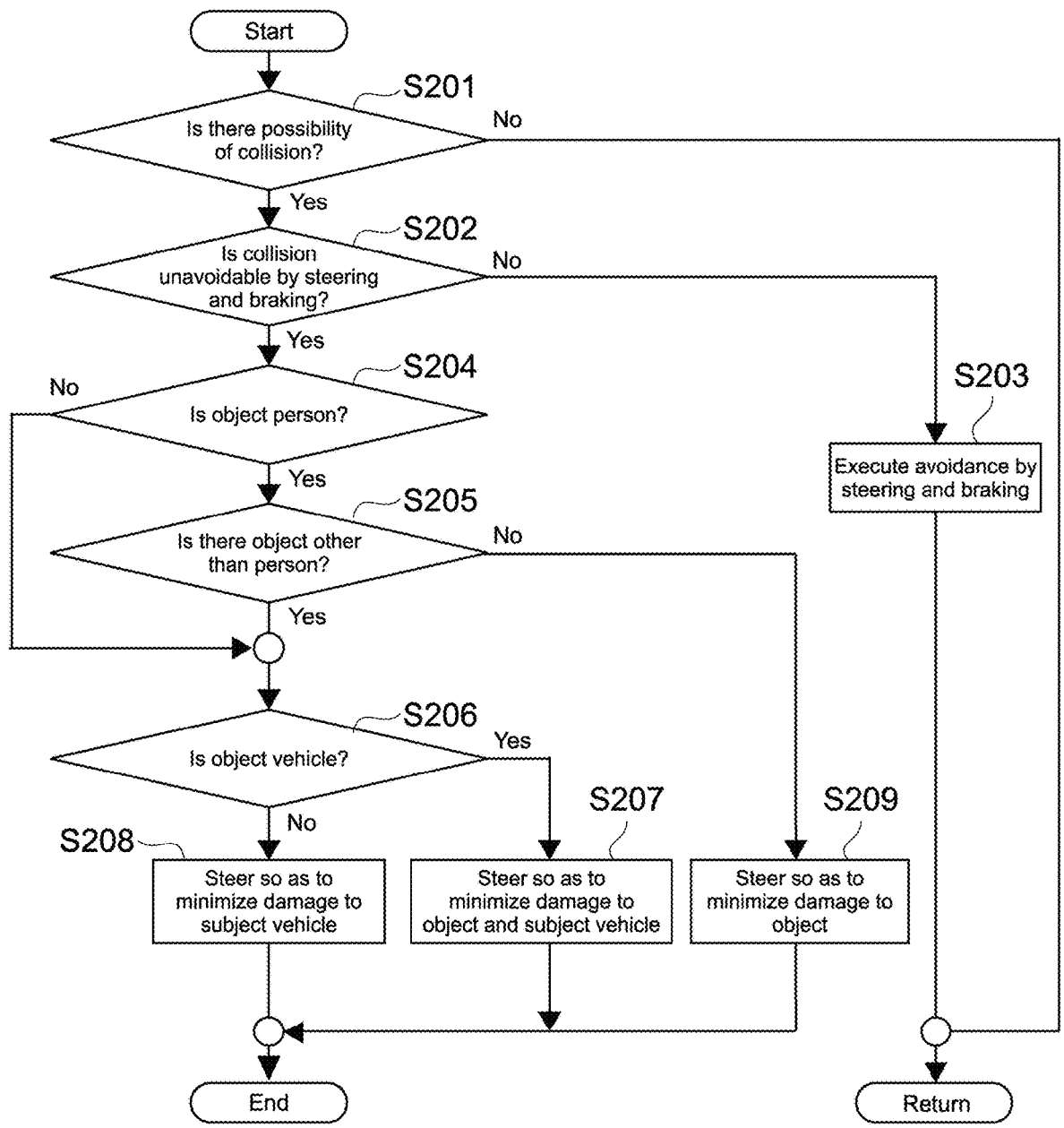
FIG. 8 is a flowchart for describing another action of the damage reduction device.

FIG. 8 is a flowchart showing a control example of the damage reduction device 1 in this embodiment.

As shown in FIG. 7, considered is a situation where the objects including the vehicle 210, the pedestrian 220, and the utility pole 230 are present in front of the automobile 100.

The damage reduction device 1 first determines whether there is a possibility that the automobile 100 collides with those objects (Step 201). This determination is executed on the basis of the output of the prediction unit 12. When there is a possibility of a collision, the damage reduction device 1 determines whether a collision is avoidable by steering and braking (Step 202).

When it is determined that a collision with each object described above is avoidable by sudden turning, sudden braking, and the like, an operation of avoiding that collision is executed (Step 203). This operation does not need an operation of the driver and causes the control unit 10 to directly output a control command to the steering device 140 and the brake device 150. In order to determine the steering direction (avoidance direction), for example, image data from the front camera 120 is referred to.

Meanwhile, when it is determined that a collision with any of the objects is unavoidable, the damage reduction device 1 determines whether the objects include a person (Step 204). When the objects include a person, the damage reduction device 1 determines whether there is an object other than the person (Step 205).

In this example, although the objects include the pedestrian 220, the vehicle 210 and the utility pole 230 are also present as the objects other than the pedestrian 220. Thus, the damage reduction device 1 controls the steering direction such that the automobile 100 collides with the objects other than the person.

When it is determined that a collision with the object other than the person is unavoidable and the object is the vehicle 210, the damage reduction device 1 determines the steering direction of the automobile 100 such that damage to the vehicle 210 and the automobile 100 becomes minimum (Steps 206 and 207). Such control is similar to that of the first embodiment described above, and thus description thereof will be omitted here.

It should be noted that when the vehicle 210 is recognized as an unmanned parked vehicle, the vehicle 210 may be considered as an unmanned structure, and steering control similar to that performed when the object is the utility pole 230 may be executed, as will be described later.

Meanwhile, when it is determined that a collision with the object other than the person is unavoidable and the object is other than the vehicle 210 (in this example, utility pole 230), the damage reduction device 1 determines the steering direction of the automobile 100 such that damage to the automobile 100 becomes minimum (Steps 206 and 208).

Figure 9:
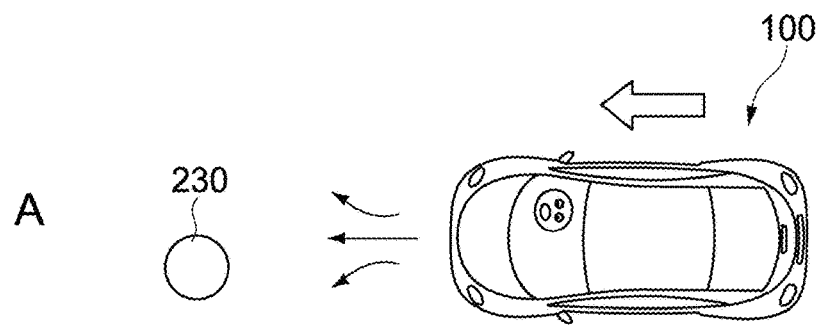
FIG. 9 is a schematic plan view for describing an operation example of an automobile in another embodiment of the present technology.
Figure 9:
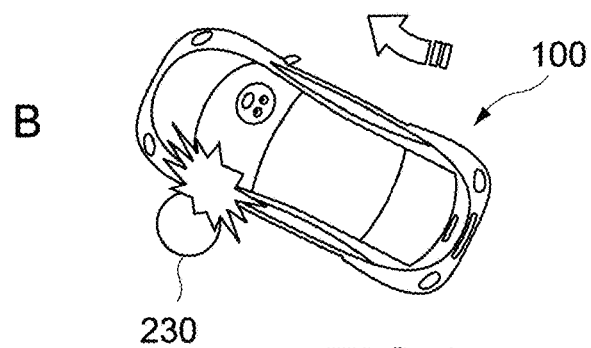

In this case, as shown in part A of FIG. 9, the damage reduction device 1 determines to which direction among right turning, left turning, and straight the steering direction of the automobile 100 is controlled. At that time, the damage reduction device 1 refers to the riding position of the passenger of the automobile 100. When there is no passenger in the front passenger seat, the damage reduction device 1 determines a pillar site on the front passenger seat side of the automobile 100 as a target collision site. The damage reduction device 1 then outputs system data regarding steering and braking of the automobile 100 to the control unit 10, so as to turn the automobile 100 to the right while applying a brake and cause the pillar part described above to collide with the utility pole 230 in a collision mode shown in part B of FIG. 9 (Step 208). It should be noted that in a case where a driving operation by a driven vehicle of the subject vehicle is being performed during the steering control described above, priority is given to the steering control by the control unit 10.

In such a manner, when the pillar site on the front passenger seat side of the automobile 100 is caused to collide with the utility pole 230, the destruction of the automobile 100 in the collision is suppressed. Therefore, compared with a case where the front part of the automobile 100 collides with the utility pole 230, damage to the passenger of the automobile 100 can be suppressed at a minimum.

To the contrary, when it is determined that a collision with the pedestrian 220 is unavoidable, the damage reduction device 1 determines the steering direction of the automobile 100 such that damage to the pedestrian becomes minimum (Step 209).

Figure 10:
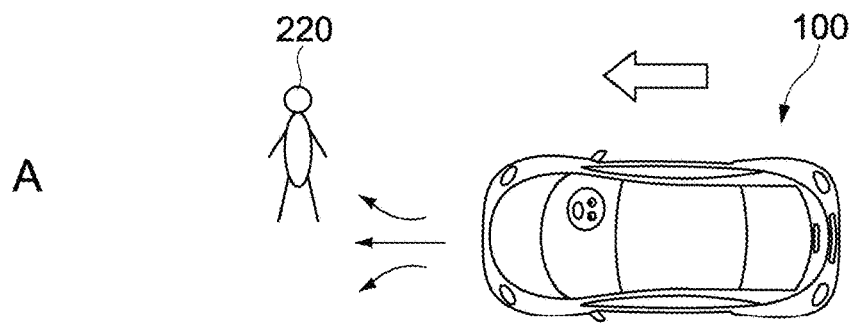
FIG. 10 is a schematic plan view for describing another operation example of the automobile.
Figure 10:
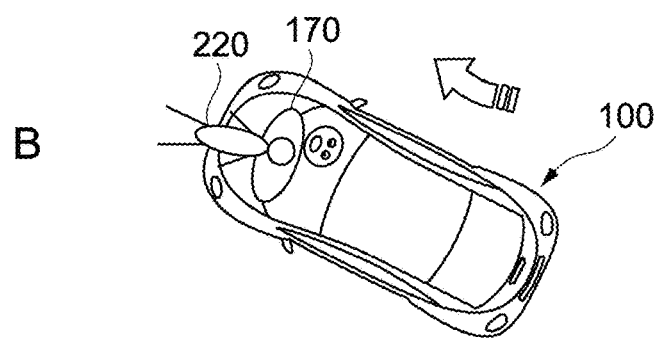

In this case, as shown in part A of FIG. 10, the damage reduction device 1 determines to which direction among right turning, left turning, and straight the steering direction of the automobile 100 is controlled. At that time, the damage reduction device 1 determines a site having the highest shock-absorbing effect in the automobile 100 (a relatively soft site such as the hood or the front glass, or a site where an air-bag for pedestrians 170 actuates) as a target collision site. The damage reduction device 1 then outputs system data regarding steering and braking of the automobile 100 to the control unit 10, so as to turn the automobile 100 to the right while applying a brake and cause the front of the automobile 100 to collide with the pedestrian 220 in a collision mode shown in part B of FIG. 10 (Step 209). It should be noted that in a case where a driving operation by a driven vehicle of the subject vehicle is being performed during the steering control described above, priority is given to the steering control by the control unit 10.

As described above, according to this embodiment, when a collision with an object is unavoidable, the collision mode is made different depending on the type of the object. Thus, damage not only to the subject vehicle but also to a different vehicle and a pedestrian can be made minimum suitably or comprehensively.

Hereinabove, the embodiments of the present technology have been described, but the present technology is not limited to the embodiments described above and can be variously modified as a matter of course.

For example, in the first embodiment described above, the case where the vehicle on the other party whose unavoidable collision is predicted is the oncoming vehicle 200 has been described, but the present technology is not limited thereto. The present technology is also effective in, for example, a right-turn/straight accident (collision accident between a vehicle turning right and a person going straight) at an intersection or a collision of vehicles on a sudden encounter.

Figure 11:
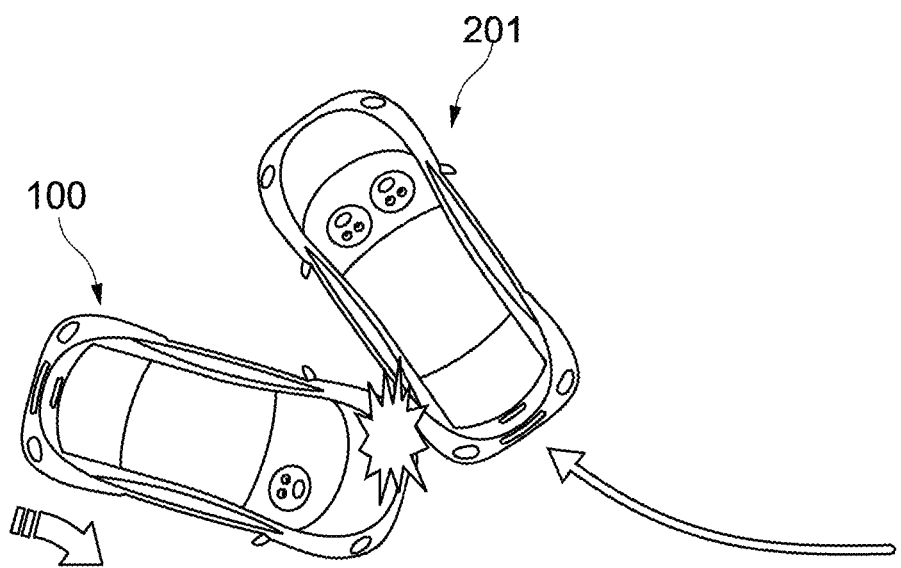
FIG. 11 is a schematic plan view for describing a modified example of an operation of the automobile in another embodiment of the present technology.

FIG. 11 shows an example of controlling a collision between an automobile 100 traveling straight and a right-turning vehicle 201. In this example, in a case where there is a passenger in the front passenger seat of the right-turning vehicle 201 and it is predicted that the automobile 100 collides with the front passenger seat side of the right-turning vehicle 201 if the automobile 100 collides linearly, the damage reduction device 1 determines a left-side rear part of the right-turning vehicle 201 as a target collision site and executes steering control to turn the automobile 100 to the right.

Figure 12:
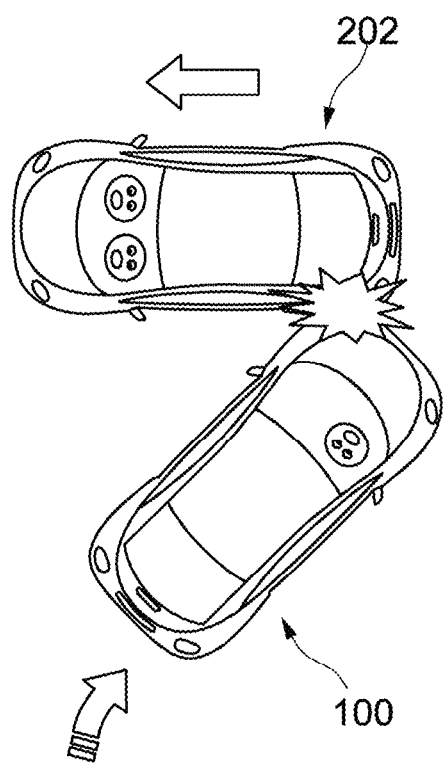
FIG. 12 is a schematic plan view for describing another modified example of an operation of the automobile.

On the other hand, FIG. 12 shows an example of controlling a collision between the automobile 100 traveling straight and a passing vehicle 202 cutting across in front of the automobile 100. As in this example, in a case where there is a passenger in the front passenger seat of the passing vehicle 202 and it is predicted that the automobile 100 collides with the front passenger seat side of the passing vehicle 202 if the automobile 100 collides linearly, the damage reduction device 1 determines a left-side rear part of the passing vehicle 202 as a target collision site and executes steering control to turn the automobile 100 to the right.

Other than the above examples, the present technology is also effective for a vehicle at a junction, a vehicle rushing out from an alley, and the like as the vehicle whose collision with the subject vehicle is unavoidable.

Furthermore, in the embodiments described above, although the automobile has been described as an example of the moving body apparatus, in addition thereto, the present technology is applicable to a boat traveling on water, an autonomous traveling robot, and the like.

It should be noted that the present technology can have the following configurations.

(1) A damage reduction device, including:
an input unit that inputs object traveling data regarding a traveling state of a manned moving body approaching a moving body apparatus and object passenger data regarding a sitting position of a passenger of the manned moving body;
a prediction unit that predicts a collision with the manned moving body on the basis of the object traveling data;
a passenger estimation unit that estimates the sitting position of the passenger of the manned moving body on the basis of the object passenger data; and
a determination unit that determines, when it is predicted that the collision with the manned moving body is unavoidable, a target collision site of the manned moving body, at which the moving body apparatus is to collide, on the basis of the sitting position of the passenger of the manned moving body.

(2) The damage reduction device according to (1), in which
the determination unit determines a non-sitting position of the passenger of the manned moving body or a vicinity thereof as a target collision site of the manned moving body.

(3) The damage reduction device according to (1) or (2), in which
the determination unit determines, when the manned moving body is moving toward the moving body apparatus and when the sitting position of the passenger of the manned moving body is estimated as only a driver's seat, a front part on a seat side next to the driver's seat as a target collision site of the manned moving body.

(4) The damage reduction device according to (1) or (2), in which
the determination unit determines, when the manned moving body is moving toward the moving body apparatus and when the sitting position of the passenger of the manned moving body is estimated as a driver's seat and a seat next thereto, the center of a front part of the manned moving body as a target collision site of the manned moving body.

(5) The damage reduction device according to any one of (1) to (4), in which
the input unit further inputs moving-body passenger data regarding a sitting position of a passenger of the moving body apparatus,
the damage reduction device further includes a passenger grasping unit that grasps the sitting position of the passenger of the moving body apparatus on the basis of the moving-body passenger data, and
the determination unit further determines a target collision site of the moving body apparatus that collides with the target collision site of the manned moving body, on the basis of the object traveling data, the object passenger data, and the moving-body passenger data.

(6) The damage reduction device according to (5), in which
the determination unit determines a non-sitting position of the passenger of the moving body apparatus or a vicinity thereof as a target collision site of the moving body apparatus.

(7) The damage reduction device according to (5), in which
the determination unit determines, when the sitting position of the passenger of the moving body apparatus is grasped as a driver's seat and a seat next thereto, the center of a front part of the moving body apparatus as a target collision site of the moving body apparatus.

(8) The damage reduction device according to any one of (1) to (7), further including
an output unit that outputs control data for moving the moving body apparatus toward the target collision site of the manned moving body, which is determined by the determination unit, to a control unit that controls a moving operation of the moving body apparatus.

(9) The damage reduction device according to any one of (1) to (8), in which
the damage reduction device is mounted to the moving body apparatus that is equipped with at least a distance sensor for a moving direction and a front camera, and
the input unit inputs data from the distance sensor and the front camera as the object traveling data and the object passenger data.

(10) A damage reduction method, including:
inputting object traveling data regarding a traveling state of a manned moving body approaching a moving body apparatus and object passenger data regarding a sitting position of a passenger of the manned moving body;
predicting a collision with the manned moving body on the basis of the object traveling data;
estimating the sitting position of the passenger of the manned moving body on the basis of the object passenger data; and
determining, when it is predicted that the collision with the manned moving body is unavoidable, a target collision site of the manned moving body, at which the moving body apparatus is to collide, on the basis of the sitting position of the passenger of the manned moving body.

(11) A program causing a computer to execute the steps of:
inputting object traveling data regarding a traveling state of a manned moving body approaching a moving body apparatus and object passenger data regarding a sitting position of a passenger of the manned moving body;
predicting a collision with the manned moving body on the basis of the object traveling data;

estimating the sitting position of the passenger of the manned moving body on the basis of the object passenger data; and determining, when it is predicted that the collision with the manned moving body is unavoidable, a target collision site of the manned moving body, at which the moving body apparatus is to collide, on the basis of the sitting position of the passenger of the manned moving body.

It should be noted that the present technology can further have the following configurations.

(12) A damage reduction device, including:

an input unit that inputs status data regarding a status in a moving direction of a moving body apparatus;

a prediction unit that predicts a collision with an object in the moving direction on the basis of the status data;

a recognition unit that recognizes a type of the object; and a determination unit that determines, when it is predicted that the collision with the object is unavoidable, a collision mode of the moving body apparatus to the object on the basis of the type of the object.

(13) The damage reduction device according to (12), in which the recognition unit recognizes whether the object is any of a manned moving body, an unmanned structure, and a person, and the determination unit determines, when the object is recognized as the manned moving body, a target collision site of the object, at which the moving body apparatus is to collide, and determines, when the object is recognized as the unmanned structure or the person, a target collision site of the moving body apparatus that collides with the object.

(14) The damage reduction device according to (13), in which the status data includes object passenger data regarding a sitting position of a passenger in the manned moving body, and the determination unit determines, when the object is recognized as the manned moving body, a target collision site of the manned moving body on the basis of the object passenger data.

(15) The damage reduction device according to (14), further including an object passenger estimation unit that estimates the sitting position of the passenger of the manned moving body on the basis of the object passenger data, in which the determination unit determines a non-sitting position of the passenger of the manned moving body or a vicinity thereof as a target collision site of the manned moving body.

(16) The damage reduction device according to (13), in which the determination unit determines, when the object is recognized as the unmanned structure, a pillar site of the moving body apparatus as a target collision site of the moving body apparatus.

(17) The damage reduction device according to (13), in which the determination unit determines, when the object is recognized as the person, a shock-absorbing site of the moving body apparatus as a target collision site of the moving body apparatus.

(18) The damage reduction device according to any one of (13) to (17), in which the input unit further inputs moving-body passenger data regarding a sitting position of a passenger of the moving body apparatus, the damage reduction device further includes a passenger grasping unit that grasps the sitting position of the passenger of the moving body apparatus on the basis of the moving-body passenger data, and the determination unit further determines a target collision site of the moving body apparatus that collides with the object, on the basis of the status data and the moving-body passenger data.

(19) The damage reduction device according to (18), in which the determination unit determines a non-sitting position of the passenger of the moving body apparatus or a vicinity thereof as a target collision site of the moving body apparatus.

(20) The damage reduction device according to any one of (12) to (19), further including an output unit that outputs control data for moving the moving body apparatus to the object in the collision mode, which is determined by the determination unit, to a control unit that controls a moving operation of the moving body apparatus.

(21) The damage reduction device according to any one of (12) to (20), in which the damage reduction device is mounted to the moving body apparatus that is equipped with at least a distance sensor for the moving direction and a front camera, and the input unit inputs data from the distance sensor and the front camera as the status data.

(22) A damage reduction method, including:

inputting status data regarding a status in a moving direction of a moving body apparatus;

predicting a collision with an object in the moving direction on the basis of the status data;

recognizing a type of the object; and determining, when it is predicted that the collision with the object is unavoidable, a collision mode of the moving body apparatus to the object on the basis of the type of the object.

(23) A program causing a computer to execute the steps of:

inputting status data regarding a status in a moving direction of a moving body apparatus;

predicting a collision with an object in the moving direction on the basis of the status data;

recognizing a type of the object; and determining, when it is predicted that the collision with the object is unavoidable, a collision mode of the moving body apparatus to the object on the basis of the type of the object.

It should be noted that the present technology can still further have the following configurations.

(24) A damage reduction device, including:

an input unit that inputs status data regarding a status in a moving direction of a moving body apparatus;

a prediction unit that predicts a collision with an object in the moving direction on the basis of the status data;

a recognition unit that recognizes whether the object includes a person; and a determination unit that determines, when the collision with the object is predicted and it is recognized that the object includes a person, a steering direction of the moving body apparatus in which a collision with the person is avoidable, on the basis of the status data.

(25) The damage reduction device according to (24), in which the determination unit determines, when it is predicted that a collision with the object other than the person is unavoidable, a collision mode of the moving body apparatus to the object on the basis of a type of the object.

(26) The damage reduction device according to (25), in which the determination unit determines, when the object is recognized as a manned moving body, a target collision site of the object, with which the moving body apparatus is to collide, and determines, when the object is recognized as an unmanned structure, a target collision site of the moving body apparatus that collides with the object.

(27) The damage reduction device according to (26), in which the status data includes object passenger data regarding a sitting position of a passenger in the manned moving body, and the determination unit determines, when the object is recognized as the manned moving body, a target collision site of the manned moving body on the basis of the object passenger data.

(28) The damage reduction device according to (27), further including an object passenger estimation unit that estimates the sitting position of the passenger of the manned moving body on the basis of the object passenger data, in which the determination unit determines a non-sitting position of the passenger of the manned moving body or a vicinity thereof as a target collision site of the manned moving body.

(29) The damage reduction device according to any one of (25) to (28), in which the input unit further inputs moving-body passenger data regarding a sitting position of a passenger of the moving body apparatus, the damage reduction device further includes a passenger grasping unit that grasps the sitting position of the passenger of the moving body apparatus on the basis of the moving-body passenger data, and the determination unit further determines a target collision site of the moving body apparatus that collides with the object, on the basis of the status data and the moving-body passenger data.

(30) The damage reduction device according to (29), in which the determination unit determines a non-sitting position of the passenger of the moving body apparatus or a vicinity thereof as a target collision site of the moving body apparatus.

(31) The damage reduction device according to any one of (24) to (30), further including an output unit that outputs control data for moving the moving body apparatus in the steering direction determined by the determination unit, to a control unit that controls a moving operation of the moving body apparatus.

(32) The damage reduction device according to any one of (24) to (31), in which the damage reduction device is mounted to the moving body apparatus that is equipped with at least a distance sensor for the moving direction and a front camera, and the input unit inputs data from the distance sensor and the front camera as the status data.

(33) A damage reduction method, including:

inputting status data regarding a status in a moving direction of a moving body apparatus;

predicting a collision with an object in the moving direction on the basis of the status data;

recognizing whether the object includes a person; and determining, when the collision with the object is predicted and it is recognized that the object includes a person, a steering direction of the moving body apparatus in which a collision with the person is avoidable, on the basis of the status data.

(34) A program causing a computer to execute the steps of:

inputting status data regarding a status in a moving direction of a moving body apparatus;

predicting a collision with an object in the moving direction on the basis of the status data;

recognizing whether the object includes a person; and determining, when the collision with the object is predicted and it is recognized that the object includes a person, a steering direction of the moving body apparatus in which a collision with the person is avoidable, on the basis of the status data.

REFERENCE SIGNS LIST 1 damage reduction device
10 control unit
11 input unit
12 prediction unit
13 object recognition unit
14 passenger estimation unit
15 passenger grasping unit
16 determination unit
17 output unit
100 automobile
110 distance sensor
120 front camera
130 vehicle interior imaging camera
140 steering device
150 brake device
200 oncoming vehicle
201 right-turning vehicle
202 passing vehicle
210 vehicle
220 pedestrian
230 utility pole

The invention claimed is:

1. A damage reduction system for a subject vehicle, the damage reduction system comprising:
   a camera having a forward field of view from the subject vehicle and configured to generate image data; and
   control circuitry configured to:
   predict a possibility of a collision with an object based on the image data;
   recognize a type of the object as a person or an unmanned structure based on the image data;
   determine, when it is predicted that the collision with the object is avoidable, a steering direction of the subject vehicle so as to avoid the collision with the object;
   determine, when it is predicted that the collision with the object is unavoidable and the object is recognized as a person, the steering direction of the subject vehicle so as to minimize damage to the person; and
   determine, when it is predicted that the collision with the object is unavoidable and the object is recognized as an unmanned structure, the steering direction of the subject vehicle so as to minimize damage to the subject vehicle.

2. The damage reduction system according to claim 1, wherein the control circuitry is configured to determine, when it is predicted that the collision with the object is unavoidable and the object is recognized as an unmanned structure, a target collision site of the subject vehicle that collides with the object.

3. The damage reduction system according to claim 1, wherein the control circuitry is configured to recognize the type of the object based at least in part on status data regarding a status in a moving direction of the subject vehicle, and
wherein the status data includes the image data.

4. The damage reduction system according to claim 1, wherein the control circuitry is configured to determine, when it is predicted that the collision with the object is unavoidable and the object is recognized as a manned vehicle, a target collision site of the manned vehicle based on passenger data regarding a sitting position of a passenger in the manned vehicle.

5. The damage reduction system according to claim 4, wherein the control circuitry is configured to:
estimate the sitting position of the passenger in the manned vehicle, and
determine a non-sitting position of the passenger in the manned vehicle or a vicinity thereof as the target collision site of the manned vehicle based on the sitting position of the passenger in the manned vehicle.

6. The damage reduction system according to claim 2, wherein the control circuitry is configured to:
determine a sitting position of a passenger in the subject vehicle, and
determine the target collision site of the subject vehicle based on the sitting position of the passenger in the subject vehicle.

7. The damage reduction system according to claim 6, wherein the control circuitry is configured to determine a non-sitting position of the passenger in the subject vehicle or a vicinity thereof as the target collision site of the subject vehicle.

8. The damage reduction system according to claim 1, further comprising a steering controller configured to control steering of the subject vehicle based on the determined steering direction.

9. The damage reduction system according to claim 1, further comprising a distance sensor configured to generate distance data representative of a distance between the subject vehicle and the object,
wherein the control circuitry is configured to predict the possibility of the collision with the object based on the image data and the distance data.

10. The damage reduction system according to claim 1, wherein the camera is mounted in a cabin of the subject vehicle.

11. The damage reduction system according to claim 1, wherein the control circuitry is configured to determine, when it is predicted that the collision with the object is unavoidable and the object is recognized as a manned vehicle, the steering direction of the subject vehicle so as to minimize damage to the subject vehicle and the manned vehicle.

12. The damage reduction system according to claim 1, wherein the control circuitry is configured to determine, when it is predicted that the collision with the object is unavoidable and the object is recognized as a manned vehicle, the steering direction of the subject vehicle so as to minimize damage to the passengers of the subject vehicle and the manned vehicle.

13. A damage reduction method, comprising:
generating image data captured by a camera having a forward field of view from a subject vehicle;
predicting a possibility of a collision with an object based at least in part on the image data;
recognizing a type of the object as a person or an unmanned structure based at least in part on the image data;
determining, when it is predicted that the collision with the object is avoidable, a steering direction of the subject vehicle so as to avoid the collision with the object;
determining, when it is predicted that the collision with the object is unavoidable and the object is recognized as a person, the steering direction of the subject vehicle so as to minimize damage to the person; and
determining, when it is predicted that the collision with the object is unavoidable and the object is recognized as an unmanned structure, the steering direction of the subject vehicle so as to minimize damage to the subject vehicle.

14. The damage reduction method according to claim 13, further comprising:
determining, when it is predicted that the collision with the object is unavoidable and the object is recognized as an unmanned structure, a target collision site of the subject vehicle that collides with the object.

15. The damage reduction method according to claim 13, further comprising:
recognizing the type of the object based at least in part on status data regarding a status in a moving direction of the subject vehicle, and
wherein the status data includes the image data.

16. The damage reduction method according to claim 13, further comprising:
determining, when it is predicted that the collision with the object is unavoidable and the object is recognized as a manned vehicle, a target collision site of the manned vehicle based on passenger data regarding a sitting position of a passenger in the manned vehicle.

17. The damage reduction method according to claim 16, further comprising:
estimating the sitting position of the passenger in the manned vehicle, and
determining a non-sitting position of the passenger in the manned vehicle or a vicinity thereof as the target collision site of the manned vehicle based on the sitting position of the passenger in the manned vehicle.

18. The damage reduction method according to claim 14, further comprising:
determining a sitting position of a passenger in the subject vehicle, and
determining the target collision site of the subject vehicle based on the sitting position of the passenger in the subject vehicle.

19. The damage reduction method according to claim 18, further comprising:
determining a non-sitting position of the passenger in the subject vehicle or a vicinity thereof as the target collision site of the subject vehicle.

20. The damage reduction method according to claim 13, further comprising:
controlling steering of the subject vehicle based on the determined steering direction.

21. The damage reduction method according to claim 13, further comprising:
generating, by a distance sensor, distance data representative of a distance between the subject vehicle and the object,
wherein the control circuitry is configured to predict the possibility of the collision with the object based on the image data and the distance data.

22. The damage reduction method according to claim 13, wherein the camera is mounted in a cabin of the subject vehicle.

23. The damage reduction method according to claim 1, further comprising determining, when it is predicted that the collision with the object is unavoidable and the object is recognized as a manned vehicle, the steering direction of the subject vehicle so as to minimize damage to the subject vehicle and the manned vehicle.

24. The damage reduction method according to claim 1, further comprising determining, when it is predicted that the collision with the object is unavoidable and the object is recognized as a manned vehicle, the steering direction of the subject vehicle so as to minimize damage to the passengers of the subject vehicle and the manned vehicle.

25. Damage reduction apparatus comprising:
control circuitry configured to:
acquire image data captured by a camera having a front view from a subject vehicle;
predict a possibility of a collision with an object based on the image data;
recognize a type of the object as a person or an unmanned structure based on the image data;
determine, when it is predicted that the collision with the object is avoidable, a steering direction of the subject vehicle so as to avoid the collision with the object;
determine, when it is predicted that the collision with the object is unavoidable and the object is recognized as a person, the steering direction of the subject vehicle so as to minimize damage to the person; and
determine, when it is predicted that the collision with the object is unavoidable and the object is recognized as an unmanned structure, the steering direction of the subject vehicle so as to minimize damage to the subject vehicle.

26. A non-transitory computer readable medium storing instructions that, when executed by control circuitry, perform a damage reduction method comprising:
acquiring image data captured by a camera having a forward field of view from a subject vehicle;
predicting a possibility of a collision with an object based at least in part on the image data;
recognizing a type of the object as a person or an unmanned structure based at least in part on the image data;
determining, when it is predicted that the collision with the object is avoidable, a steering direction of the subject vehicle so as to avoid the collision with the object;
determining, when it is predicted that the collision with the object is unavoidable and the object is recognized as a person, the steering direction of the subject vehicle so as to minimize damage to the person; and
determining, when it is predicted that the collision with the object is unavoidable and the object is recognized as an unmanned structure, the steering direction of the subject vehicle so as to minimize damage to the subject vehicle.

* * * * *